United States Patent
Tardif et al.

(10) Patent No.: US 10,417,975 B2
(45) Date of Patent: Sep. 17, 2019

(54) WIDE FIELD OF VIEW SCANNING DISPLAY (71) Applicant: Microsoft Technology Licensing, LLC, Redmond, WA (US)

(72) Inventors: John Tardif, Sammamish, WA (US); Joshua O Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/477,962

(22) Filed: Apr. 3, 2017

(65) Prior Publication Data
US 2018/0286320 A1   Oct. 4, 2018

(51) Int. Cl.
*G09G 3/34* (2006.01)
*G02B 26/10* (2006.01)
(Continued)

(52) U.S. Cl.
CPC ......... *G09G 3/346* (2013.01); *G02B 26/0833* (2013.01); *G02B 26/101* (2013.01); *G02B 26/123* (2013.01); *G02B 27/0093* (2013.01); *G02B 27/0172* (2013.01); *G09G 3/025* (2013.01); *G02B 2027/0112* (2013.01); *G02B 2027/0123* (2013.01); *G02B 2027/0147* (2013.01)

(58) Field of Classification Search
None
See application file for complete search history.

(56) References Cited

U.S. PATENT DOCUMENTS 6,351,335 B1   2/2002   Perlin
7,252,394 B1*  8/2007   Fu ..................... G03B 21/28
                                        348/E9.026
(Continued)

FOREIGN PATENT DOCUMENTS

WO   2016116741 A1   7/2016

OTHER PUBLICATIONS

Hofmann, et al., "High-Q MEMS Resonators for Laser Beam Scanning Displays", In Proceedings of Micromachines, vol. 3, Issue 2, Jun. 6, 2012, pp. 509-528.
(Continued)

*Primary Examiner* — Nicholas J Lee
(74) *Attorney, Agent, or Firm* — Arent Fox LLP (57) ABSTRACT

A scanning display device includes a MEMS scanner having a biaxial MEMS mirror or a pair of uniaxial MEMS mirrors. A controller communicatively coupled to the MEMS scanner controls rotation of the biaxial MEMS mirror or uniaxial MEMS mirrors. A first light source is used to produce a first light beam, and second light source is used to produce a second light beam. The first and second light beams are simultaneously directed toward and incident on the biaxial MEMS mirror, or a same one of the pair of uniaxial MEMS mirrors, at different angles of incidence relative to one another. The controller controls rotation of the biaxial MEMS mirror or the uniaxial MEMS mirrors to simultaneously raster scan a first portion of an image using the first light beam and a second portion of the image using the second light beam. Related methods and systems are also disclosed.

19 Claims, 7 Drawing Sheets

(51) Int. Cl.
    *G02B 26/08*     (2006.01)
    *G02B 27/01*     (2006.01)
    *G09G 3/02*     (2006.01)
    *G02B 26/12*     (2006.01)
    *G02B 27/00*     (2006.01)

(56) References Cited

U.S. PATENT DOCUMENTS

| | | |
|---|---|---|
| 7,550,713 B2 | 6/2009 | Gibson et al. |
| 8,786,675 B2 | 7/2014 | Deering |
| 8,861,058 B2 | 10/2014 | Rothaar et al. |
| 9,071,742 B2 | 6/2015 | Birkbeck et al. |
| 9,116,350 B2 | 8/2015 | Freedman et al. |
| 2004/0263943 A1 | 12/2004 | Starkweather |
| 2005/0046909 A1* | 3/2005 | Kobayashi ............ G02B 26/101 358/474 |
| 2006/0139714 A1 | 6/2006 | Gruhlke et al. |
| 2010/0056274 A1 | 3/2010 | Uusitalo et al. |
| 2010/0149073 A1* | 6/2010 | Chaum ............ G02B 27/0093 345/8 |
| 2012/0105310 A1 | 5/2012 | Sverdrup et al. |
| 2012/0154277 A1 | 6/2012 | Bar-zeev et al. |
| 2014/0218468 A1 | 8/2014 | Gao et al. |
| 2014/0247277 A1 | 9/2014 | Guenter et al. |
| 2015/0277123 A1 | 10/2015 | Chaum et al. |
| 2016/0033771 A1 | 2/2016 | Tremblay et al. |
| 2016/0274365 A1* | 9/2016 | Bailey ................ G02B 27/0093 |

OTHER PUBLICATIONS

"International Search Report and Written Opinion Issued in PCT Application No. PCT/US18/024689", dated Jul. 11, 2018, 10 Pages.

\* cited by examiner

WIDE FIELD OF VIEW SCANNING DISPLAY

BACKGROUND

A scanning display device functions by creating "virtual pixels," each of which is a function of the position of a biaxial mirror (or the positions of two uniaxial mirrors) and the magnitude of the signals that drive one or more light emitting elements (e.g., laser diodes) of a light source that produces a light beam that is reflected by the mirror(s). The light emitting element(s) of the light source can be pulsed rapidly to create each pixel in a high resolution display. The field-of-view (FOV) provided by a scanning display is typically limited by the size of the one or more MEMS mirrors included in the scanning device, as well as the limitation as to how far the one or more MEMS mirrors can be rotated about a fast-scan axis and a slow-scan axis.

SUMMARY

A scanning display device, and more generally an apparatus, includes a MEMS scanner, a controller and first and second light sources. The MEMS scanner includes a biaxial MEMS mirror or a pair of uniaxial MEMS mirrors. The controller is communicatively coupled to the MEMS scanner and configured to control rotation of the biaxial MEMS mirror or the pair of uniaxial MEMS mirrors of the MEMS scanner. The first light source includes one or more light emitting elements (e.g., laser diodes) and is configured to produce a first light beam. Similarly, the second light source includes one or more light emitting elements and is configured to produce a second light beam. The first and second light beams produced respectively by the first and second light sources are simultaneously directed toward and incident on the biaxial MEMS mirror, or a same one of the pair of uniaxial MEMS mirrors, at different angles of incidence relative to one another. The controller is configured to control the rotation of the biaxial MEMS mirror or the pair of uniaxial MEMS mirrors of the MEMS scanner to simultaneously raster scan a first portion of an image using the first light beam and a second portion of the image, which is adjacent to the first portion of the image, using the second light beam. Such an apparatus can be or be part of a virtual reality (VR) or augmented reality (AR) head mounted display (HMD), and a raster scanned image produced by the apparatus can be a virtual image that is viewable by a wearer of the HMD. Other variations are also possible and within the scope of the embodiments described herein.

In accordance with certain embodiments, the first light source includes red, green and blue laser diodes that are configured to respectively emit red, green and blue light and one or more elements that is/are configured to combine the red, green and blue light into the first light beam. Similarly, the second light source includes further red, green and blue laser diodes that respectively emit further red, green and blue light and one or more further elements that is/are configured to combine the further red, green and blue light into the second light beam.

In accordance with certain embodiments, the first portion of the image has a first resolution, and the second portion of the image has a second resolution that is lower than the first resolution. In such embodiments, the first portion of the image can be a foveal region of the image, and the second portion of the image can be a non-foveal region of the image.

In accordance with certain embodiments, a first spot size produced using the first light beam that is used to raster scan the first portion of the image is smaller than a second spot size produced using the second light beam that is used to raster scan the second portion of the image.

The apparatus can also include first and second light source drivers. The first light source driver is configured to selectively drive the one or more light emitting elements of the first light source to thereby produce the first light beam. Similarly, the second light source driver is configured to selectively drive the one or more light emitting elements of the second light source to thereby produce the second light beam. Where the apparatus includes additional light sources, the apparatus would also include additional light source drivers.

The apparatus can also include an image processor that is configured to produce first pixel data that is provided to the first light source driver and used by the first light source driver to control timings of when, and magnitudes at which, the one or more light emitting elements of the first light source are driven. The image processor is also configure to produce second pixel data that is provided to the second light source driver and used by the second light source driver to control timings of when, and magnitudes at which, the one or more light emitting elements of the second light source are driven. Where the light source driver includes additional light sources that are used, e.g., to raster scan one or more additional portions of the image, the image processor can produce further pixel data. In certain embodiments, the image processor produces the first and second pixel data to control the magnitudes at which the one or more light emitting elements of the first and second light sources are driven to compensate for how brightnesses of the first and second portions of the image are affected by the second portion of the image having a lower resolution than the first portion of the image.

In accordance with certain embodiments, the apparatus includes one or more further light sources configured to produce one or more further light beams. In certain such embodiments, the one or more further light beams, produced by the one or more further light sources, along with the first and second light beams, are simultaneously directed toward and incident on the biaxial MEMS mirror, or the same one of the pair of uniaxial MEMS mirrors, at different angles of incidence relative to one another, and the biaxial MEMS mirror or the pair of uniaxial MEMS mirrors also raster scan one or more further portions of the image, using the one or more further light beams, simultaneously with raster scanning the first and second portions of the image.

In accordance with certain embodiments, the apparatus includes a third light source configured to produce a third light beam, wherein the third light beam produced by the third light source, along with the first and second light beams, are simultaneously directed toward and incident on the biaxial MEMS mirror, or the same one of the pair of uniaxial MEMS mirrors. In certain such embodiments, the biaxial MEMS mirror or the pair of uniaxial MEMS mirrors of the MEMS scanner are used to raster scan the first portion of the image simultaneously using both the first light beam and the third light beam to thereby double a line count of the first portion of the image compared to if it were scanned using only one light beam. In such embodiments, the first portion of the image will have double the line count than that of the second portion of the image that is raster scanned using only that second light beam. In specific such embodiments, the first portion of the image corresponds to a foveal region and the second portion of the image, with the low line count, corresponds to a non-foveal region.

Methods according to certain embodiments of the present technology involve selectively driving one or more light emitting elements of a first light source and selectively driving one or more light emitting elements of a second light source to thereby produce a first light beam and a second light beam that are simultaneously directed towards and incident on a biaxial MEMS mirror, or a same uniaxial MEMS mirror of a pair of uniaxial MEMS mirrors, at different angles of incidence relative to one another. The methods also involves controlling rotation of the biaxial MEMS mirror, or the pair of uniaxial MEMS mirrors, to simultaneously raster scan a first portion of an image using the first light beam and a second portion of the image, which is adjacent to the first portion of the image, using the second light beam.

In accordance with certain embodiments, the methods also include selectively driving one or more light emitting elements of one or more further light sources to thereby produce one or more further light beams that is/are directed towards and incident on the biaxial MEMS mirror, or the same uniaxial MEMS mirror of the pair of uniaxial MEMS mirrors, that the first and second light beams are directed toward and incident on. Such methods can also include using the biaxial MEMS mirror, or the pair of uniaxial MEMS mirrors, to also raster scan one or more further portions of the image, using the one or more further light beams, simultaneously with raster scanning the first and second portions of the image.

The methods can also include producing first pixel data corresponding to the first portion of the image and second pixel data corresponding to the second portion of the image, and using the first pixel data and the second pixel data to perform the selective driving of the one or more light emitting elements of the first light source and the selective driving of the one or more light emitting elements of the second light source to thereby produce the first light beam and the second light beam that are simultaneously directed toward and incident on the biaxial MEMS mirror or the same one of the pair of uniaxial MEMS mirrors.

In accordance with certain embodiments, a method also includes selectively driving one or more light emitting elements of a third light source to thereby produce a third light beam that is directed towards and incident on the biaxial MEMS mirror, or the same uniaxial MEMS mirror of the pair of uniaxial MEMS mirrors, that the first and second light beams are directed toward and incident on. The method also involves simultaneously using both the first light beam and the third light beam to raster scan the first portion of the image to thereby double a line count of the first portion of the image compared to if the first portion of the image was raster scanned using only the first light beam. Such a method can include producing first pixel data, second pixel data and third pixel data, which are used to control timings of when, and magnitudes at which, the light emitting elements of the first, second and third light sources are driven to produce the first, second and third light beams. This can include selecting the magnitudes at which the light emitting elements of the first, second and third light sources are driven to compensate for how brightnesses of first and second portions of the image are affected by the first portion of the image being raster scanned using both the first and third light beams while the second portion of the image is raster scanned using only the second light beam.

Certain embodiments of the present technology are directed toward a near eye or heads up display system. Such a system can includes a MEMS scanner, a controller, first and second light sources, first and second light source drivers, and one or more optical waveguides. The MEMS scanner includes a biaxial MEMS mirror or a pair of uniaxial MEMS mirrors. The controller is communicatively coupled to the MEMS scanner and configured to control rotation of the biaxial MEMS mirror or the pair of uniaxial MEMS mirrors of the MEMS scanner. The first light source includes one or more light emitting elements (e.g., laser diodes), and the second light source similarly includes one or more light emitting elements. The first light source driver is configured to selectively drive the one or more light emitting element of the first light source to thereby produce a first light beam. The second light source driver is configured to selectively drive the one or more light emitting element of the second light source to thereby produce a second light beam. The one or more optical waveguides each includes an input-coupler and an output-coupler. In accordance with certain embodiments, the first and second light beams are simultaneously directed toward and incident on the biaxial MEMS mirror, or a same one of the pair of uniaxial MEMS mirrors, at different angles of incidence relative to one another. The controller is configured to control the rotation of the biaxial MEMS mirror or the pair of uniaxial MEMS mirrors of the MEMS scanner to simultaneously raster scan a first portion of an image using the first light beam and a second portion of the image using the second light beam.

Light corresponding to the first and second portions of the image (that are raster scanned using the first and second light beams reflected from the biaxial MEMS mirror or the pair of uniaxial MEMS mirrors, under the control of the controller) is coupled into the one or more optical waveguides via the input-coupler(s) of the optical waveguide(s). Further, the light corresponding to the first and second portions of the image, that is coupled into the optical waveguide(s) via the input-coupler(s), travels at least in part by way of total internal reflection (TIR) from the input-coupler(s) to the output-coupler(s) of the waveguide(s). The output-coupler(s) of the waveguide(s) is/are configured to couple light corresponding to the first and second portions of the image, that has traveled within the optical waveguide(s) from the input-coupler(s) to the output-coupler(s), out of the optical waveguide(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
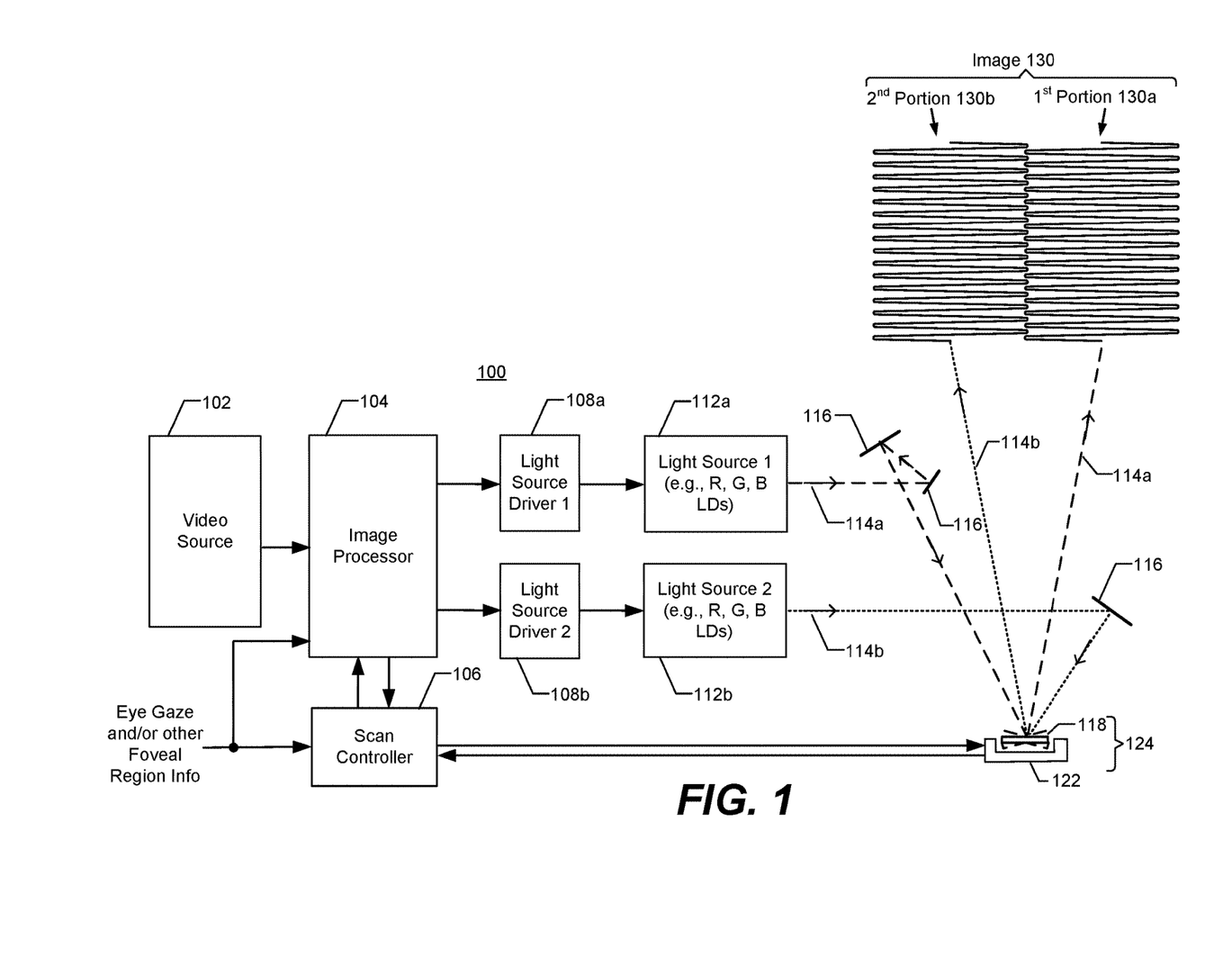
FIG. 1 illustrates a scanning display device, according to an embodiment of the present technology, which can simultaneously raster scan first and second adjacent portions of an image using a same biaxial scanning mirror, or a same pair of uniaxial scanning mirrors, and first and second light beams.

FIG. 1 illustrates an exemplary scanning display device 100, according to an embodiment of the present technology. The scanning display device 100, which can also be referred to as a scanning display engine, or more generally a display engine, can be integrated with or attached to a portable device, such as, but not limited to, a mobile phone, a smart phone, a portable computer (e.g., a laptop, netbook or tablet), a personal data assistant (PDA), or a portable media player (e.g., DVD player). The scanning display device 100 can alternatively be integrated with or attached to a non-portable device, such as a desktop computer, a media player (e.g., a DVD player), or an automotive heads up display.

It is also possible that the scanning display device 100 is part of a virtual reality (VR) or augmented reality (AR) head mounted display (HMD) or heads-up display (HUD), and that the scanning display device 100 produces virtual images that are viewable by a wearer of the HMD or observer of the HUD. More specifically, light corresponding to images produced by the scanning display device 100 can be coupled into one or more optical waveguides, and after travelling through the waveguide(s) by way of total internal reflection (TIR), can be out-coupled from the waveguide(s) so that the light is output and imaged from an output-pupil associated with the waveguide(s). Such AR devices, which can be referred to as see-through, mixed reality display systems, enable a user to see through a transparent or semi-transparent display of a device to view the surrounding environment, and also see images of virtual objects (e.g., text, graphics, video, etc.) that are generated for display to appear as a part of, and/or overlaid upon, the surrounding environment. Other variations are also possible and within the scope of the embodiments of the present technology described herein.

Referring to FIG. 1, the scanning display device 100 is shown as including a video source 102, an image processor 104, a scan controller 106, light source drivers 108a and 108b, and light sources 112a and 112b. Depending on the type of video source, a video analog-font-end (AFE) (not shown) can be included between the video source 102 and the image processor 104, and the video AFE may include, e.g., one or more analog-to-digital converters (ADCs). However, a video AFE may not be needed where the video source 102 is a digital video source. The scanning display device 100 is also shown as including a MEMS scanning device 122 and MEMS mirror(s) 118, which can be collectively referred to as a MEMS scanner 124. The MEMS mirror(s) 118 can be a single biaxial MEMS mirror, or a pair of uniaxial MEMS mirrors.

The image processor 104 receives red (R), green (G) and blue (B) pixel data (or other color pixel data), a horizontal synchronization (Hsync) signal and a vertical synchronization (Vsync) signal from the video source 102 (or a video AFE). The Hsync signal includes one pulse per horizontal line of a frame, which indicates the end of one line and the beginning of the next line. The Vsync signal includes one pulse per frame, which indicates the end of one frame and the beginning of the next frame. The image processor 104 can also receive information indicative of the position and speed of the mirror(s) 118 from the scan controller 106, or alternatively, directly from the MEMS scanning device 122. The image processor 104 can also receive eye gaze information and/or other information that can be used by the image processor 104 to perform foveated rendering of images. Such eye gaze information can come from an eye tracking device or subsystem that is not specifically shown in FIG. 1.

The image processor 104 can be implemented, e.g., using an application specific integrated circuit (ASIC) and/or a micro-controller. The image processor 104 can perform scaling and/or pre-distortion of the R, G and B pixel data (also referred to simply as RGB pixel data) before such pixel data signals are provided to the light source drivers 108a and 108b. Such scaling and/or pre-distortion can include interpolation and/or decimation. More generally, the image processor 104 can perform gamma correction, color space conversion, interpolation and/or decimation. The interpolation and/or decimation can be performed to map the input RGB pixel data (received from the video source 102, or an AFE) to the output RGB pixel data that is provided to the light source drivers 108, by taking into account the actual scanning trajectory and the actual position of the scanning mirror(s) 118. The processing of the RGB pixel data (including the interpolation and/or decimation) can differ based on whether an odd frame or an even frame is being processed, and/or based on other factors. The image processor 104 can also perform foveated rendering.

In accordance with certain embodiments of the present technology, where an image is produced by simultaneously raster scanning multiple separate portions of an image using multiple different light beams (and the same biaxial MEMS mirror, or the same pair of uniaxial MEMS mirrors), the image processor 104 produces separate pixel data for each of the image portions. In certain embodiments, the image processor 104 can perform tiled rendering, which is a process of subdividing a computer graphics image by a regular grid in optical space and rendering each section of the grid, or tile, separately. More generally, the image processor 104 can divide an image into multiple image portions and can produce separate pixel data for each of the image portions, wherein each separate pixel data is provided to a separate light source driver 108 via parallel or serial buses, or the like. In certain embodiments the image processor 104 can perform a combination of tiled rendering and foveated rendering such that the image portion corresponding to a foveal region has a greater resolution that the one or more other image portions corresponding to a non-foveal region.

The image processor 104 communicates with the scanning controller 106, which can also be referred to as scanning micro-mirror(s) controller 106, microelectromechanical systems (MEMS) controller, or a MEMS driver. The scanning controller 106 can produce a horizontal scanning control signal (H scanning control signal) and a vertical scanning control signal (V scanning control signal), which are used to control the scanning of the MEMS mirror(s) 118, which can also be referred to as micro-mirror(s) 118. Where a single biaxial scanning mirror 118 is used, the H and V scanning control signals can be combined into a combined H and V scanning control signal, which can also be referred to as a composite H and V scanning control signal, or the scanning controller 106 can produce a combined H and V scanning control signal. Where two uniaxial scanning mirrors 118 are used, the H and V scanning control signals are not combined. The combined H and V scanning control signal (or separate H and V scanning control signals) are provided to a MEMS scanning device 122 to control the scanning mirror(s) 118. While shown as two separate blocks in FIG. 1, it is also within the scope of an embodiment to combine the image processor 104 and the scanning controller 106 into one functional block or circuit.

Typically, horizontal scanning occurs much faster than vertical scanning, and thus, horizontal scanning is sometimes referred to as scanning in a fast-axis direction, and vertical scanning is sometimes referred to as scanning in a slow-axis direction. Where horizontal scanning is faster than vertical scanning, as is typically the case, the H scan control signal can also be referred to as a fast scan control signal or waveform, and the V scan control signal can also be referred to as the slow scan control signal or waveform. Where a biaxial scanning mirror is being used, the same mirror is rotated in both a fast-axis direction and a slow-axis direction. Where two uniaxial scanning mirrors are being used, one of the mirrors is rotated in the fast-axis direction, and the other one of the mirrors is rotated in the slow-axis direction.

While not shown in FIG. 1, the scanning display device 100 can also include a voltage regulator (e.g., a quad-output adjustable DC-DC buck-boost regulator) that converts a voltage provided by a voltage source (e.g., a battery or AC supply) into the various voltage levels (e.g., four voltage levels V1, V2, V3 and V4) for powering the various components of the scanning display device 100. Each of the light source drivers 108*a* and 108*b* can include multiple (e.g., three) digital-to-analog converts (DACs), registers and a communication interface for receiving enable and clock signals from a communication interface of the image processor 104. Additionally, the image processor 104 can write data to and read data from registers within the light source drivers 108*a* and 108*b*.

The light source 112*a* can include one or more light emitting elements, and in certain embodiments, includes red (R), green (G) and blue (B) laser diodes. Similarly, the light source 112*b* can include one or more light emitting elements, and in certain embodiments, includes red (R), green (G) and blue (B) laser diodes. Where each of the light sources includes R, G and B laser diodes, each of the light source drivers 108*a* and 108*b* include three DACs, wherein each DAC is used to drive a separate laser diode, or more generally, a separate light emitting element. Where the light source drivers 108*a* and 108*b* are used to drive laser diodes, each of the light source drivers 108*a* and 108*b* can be referred to as a laser diode driver (LDD). It is possible that alternative types of light emitting elements may be used in place of laser diodes, such as, but not limited to, one or more light emitting diode (LEDs), super luminescent light emitting diodes (SLEDs), or a quantum dot light emitting diodes (QD-LED). The light sources 112*a* and 112*b* can be referred to individual as a light source 112, or collectively as the light sources 112. The light source drivers 108*a* and 108*b* can be referred to individually as a light source driver 108, or collectively as the light source drivers 108. As will be described in additional details below, in accordance with certain embodiments of the present technology, a scanning display device includes even more than two light source drivers 108 and more than two light sources 112.

Each of the light sources 112 can also include combiner optics. The light produced by the laser diodes or other light emitting elements of each light source 112 can be provided to beam splitters, which can direct a small percentage of the light toward one or more calibration photo-detectors (PDs), and direct the remainder of the light toward combiner optics, which can include dichroic lenses, dichroic mirrors, reflection plates and/or the like, which combine the R, G and B light (and/or light of one or more other wavelengths) into a single light beam. The light output by the optics can be provided to the MEMS mirror(s) 118, that is/are maneuvered (e.g., rotated) by the scanning device 122. Where the display is monochrome, each light source 112 can include a single light emitting element, or multiple light emitting elements that produce light of the same wavelength.

The light beam 114*a* produced by the light source 112*a* (shown as a dashed line) and the light beam 114*b* produced by the light source 112*b* (shown as a dotted line) are simultaneously directed toward and incident on a same one of the MEMS mirror(s) 118, using static mirrors 116, or the like, albeit at different angles of incidence, as shown in FIG. 1. More specifically, where the MEMS mirror(s) 118 is implemented as a single biaxial MEMS mirror, the light beams 114*a* and 114*b* produced by the light sources 112*a* and 112*b* (shown, respectively, as a dashed and dotted lines) are simultaneously directed toward and incident on the single biaxial MEMS mirror. Where the MEMS mirror(s) 118 is implemented as a two uniaxial MEMS mirrors, one of which is used for horizontal scanning, and the other one of which is used for vertical scanning, the light beams 114*a* and 114*b* produced by the light sources 112*a* and 112*b* (shown, respectively, as a dashed and dotted lines) are simultaneously directed toward and incident on a same one of the uniaxial MEMS mirrors. The light beams 114*a* and 114*b* can be individually referred to as a light beam 114, or collectively as the light beams 114.

As noted above, the mirror(s) 118 can be implemented, for example, using a single scanning mirror (which is often referred to as a biaxial mirror) or using two uniaxial scanning mirrors. The scanning device 122 can include horizontal and vertical position sensors (e.g., Piezo-resistive sensors) that provide one or more position feedback signal(s) indicative of the position of the mirror(s) 118 to the scanning controller 106, to provide real time position information to the scanning controller 106. It is also possible that the position sensors are separate from the scanning device 122. The position sensors can sense the angle of rotation of the mirror(s) 118 along the H and V scan directions, or more generally, along the fast-axis and slow-axis scan directions. In certain embodiments, the scanning device 122 uses moving-coil actuation with a single drive coil (also referred to as an actuator coil) to maneuver a single biaxial scanning mirror 118. Alternatively, the scanning device 122 can maneuver two uniaxial scanning mirrors using two drive coils. The scanning device 122 can also be referred to as a MEMS device, the scanning mirror(s) 118 can also be referred to as MEMS scanning mirror(s), and the MEMS device 122 and the scanning mirror(s) 118 can collectively be referred to as a MEMS scanning mirror assembly 124, or simply a MEMS scanner 124.

The scan controller 106 can control the MEMS scanner 124 to maneuver the mirror(s) 118 to raster-scan the reflected light beams 114 onto a surface, e.g., a screen, a wall, the back of a chair, etc., to thereby form an image 130. Alternatively, the raster-scanned reflected light beams 114 can be coupled into input-coupler(s) of one or more optical waveguides of an HMD or HUD, and the waveguides can guide the light to output-coupler(s) that out-couple the light, as will be described below with reference to FIG. 7. Other variations are also possible.

In accordance with certain embodiments of the present technology, the scan controller 106 controls the MEMS mirror(s) 118 to simultaneously raster scan a first portion 130a of an image 130 using the light beam 114a and a second portion 130b of the image 130, which is adjacent to the first portion 130a of the image 130, using the second light beam. By simultaneously using multiple separate light beams 114 to raster scan multiple separate portions (e.g., 130a and 130b) of an image 130 using the same biaxial mirror 118 (or the same pair of uniaxial mirrors 118), the field-of-view (FOV) of the resulting image can be increased beyond what is possible if a single light and a single biaxial mirror (or a single pair of uniaxial mirrors) were used to raster scan an entire image. Indeed, the FOV can be increased by about 90% where two separate light beams 114a and 114b are used to raster scan two separate portions 130a and 130b of an image 130 using the same biaxial mirror 118 (or the same pair of uniaxial mirrors 118), compared to if a single light beam and a single biaxial mirror (or a single pair of uniaxial mirrors) were used to raster scan an entire image.

Figure 2:
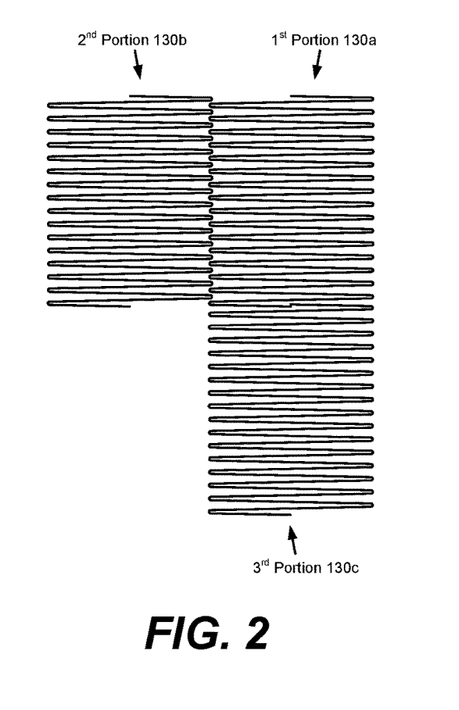
FIG. 2 illustrates how a scanning display device can simultaneously raster scan three portions of an image using a same biaxial scanning mirror, or a same pair of uniaxial scanning mirrors, and three light beams.

In accordance with certain embodiments, the scanning display device 100 can include one or more further light source drivers 108 (not shown) and one or more further light sources 112 (now shown) that each produce a respective light beam 114, such that the scanning display device 100 includes three or more light source drivers 108 and three or more light sources 112 that collectively produce three or more light beams 114. The further light beam(s), produced by the further light source(s), along with the light beams 114a and 114b are simultaneously directed toward and incident on the same MEMS mirror, of the one or more MEMS mirrors 118, at different angles of incidence relative to one another. In such embodiments, the MEMS mirror(s) 118 also raster scan one or more further portions of the image, using the one or more further light beams, simultaneously with raster scanning the portions 130a and 130b of the image 130. The portions of an image can also be referred to herein as image portions, sub-images, image tiles, or simply tiles. The resulting raster scanned image, which is made up of multiple portions of the image, can be rectangular, as shown in FIG. 1. However, that need not be the case. For example, FIG. 2 illustrates how three light source drivers 108 and three light sources 112 that collectively produce three light beams 114 can be used to raster scan three portions of an image that has an inverted L-shape that is intended to be viewed by a right eye. An inverter L-shaped image that is similar to the one shown in FIG. 2, but flipped along the vertical axis, can be raster scanned and be intended for viewing by a left eye.

Figure 3:
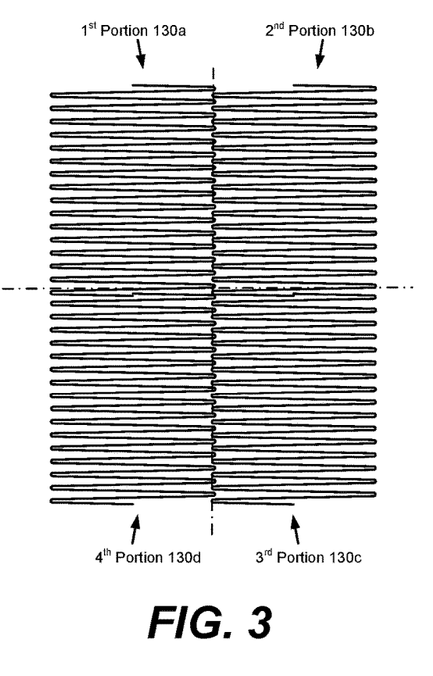
FIG. 3 illustrates how a scanning display device can simultaneously raster scan four portions of an image using a same biaxial scanning mirror, or a same pair of uniaxial scanning mirrors, and four light beams.
Figure 4:
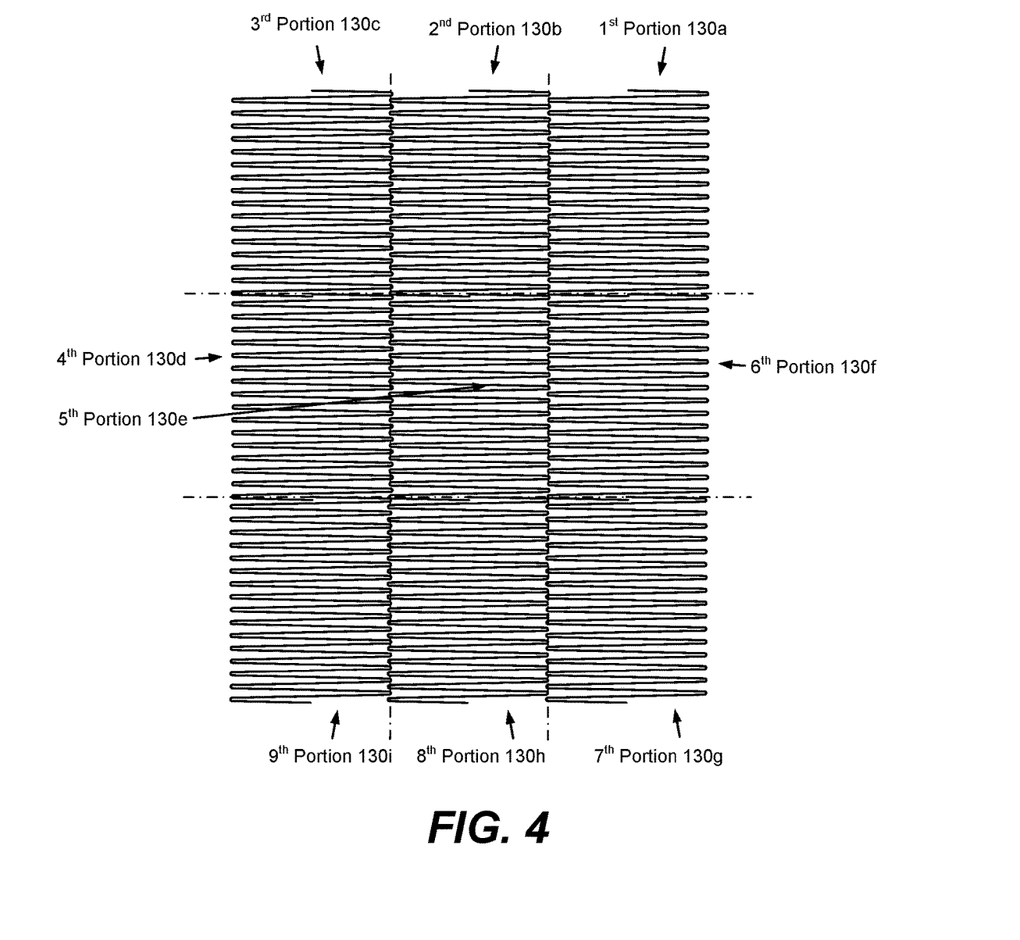
FIG. 4 illustrates how a scanning display device can simultaneously raster scan nine portions of an image using a same biaxial scanning mirror, or a same pair of uniaxial scanning mirrors, and nine light beams.
Figure 5:
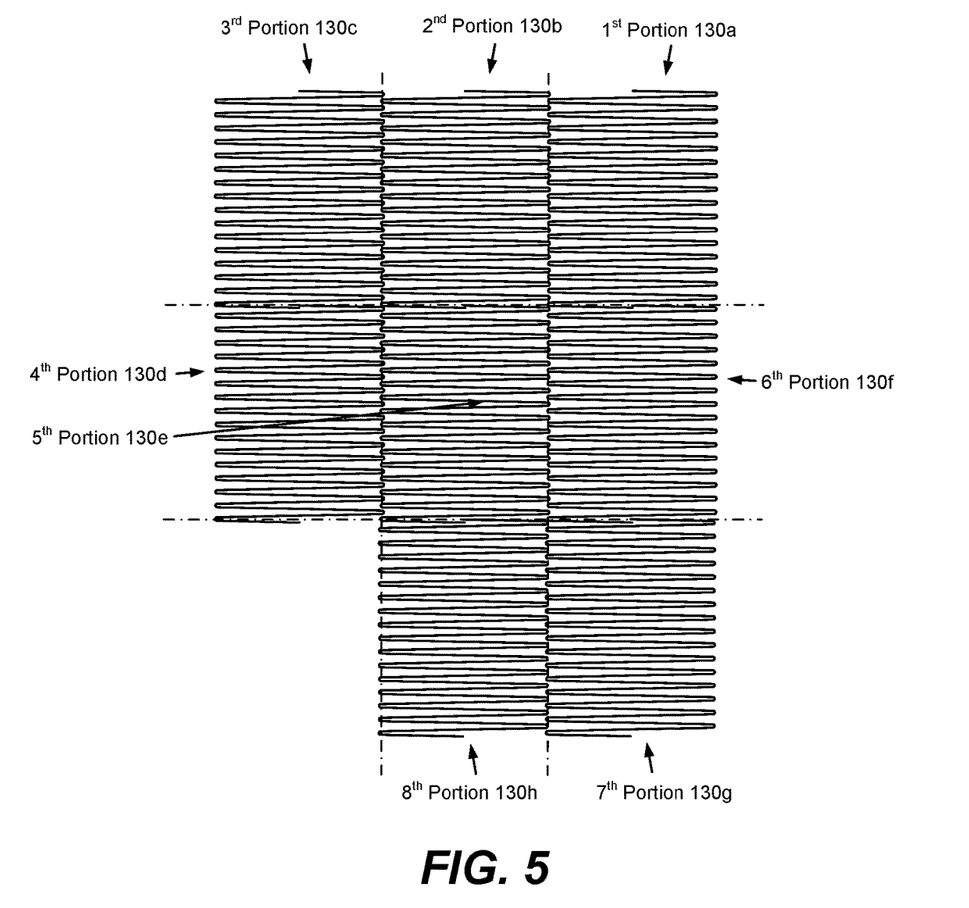
FIG. 5 illustrates how a scanning display device can simultaneously raster scan eight portions of an image using a same biaxial scanning mirror, or a same pair of uniaxial scanning mirrors, and eight light beams.

FIG. 3 illustrates how four light source drivers 108 and four light sources 112 that collectively produce four light beams 114 can be used to raster scan a rectangular image made up by a 2×2 grid or array of image portions 130a, 130b, 130c and 130d. FIG. 4 illustrates how nine light source drivers 108 and nine light sources 112 that collectively produce nine light beams 114 can be used to raster scan a rectangular image made up by a 3×3 grid or array of image portions 130a, 130b, 130c, 130d, 130e, 130f, 130g, 130h, 130i. FIG. 5 illustrates how eight light source drivers 108 and eight light sources 112 that collectively produce eight light beams 114 can be used to raster scan another example of a non-rectangular image made up image portions 130a, 130b, 130c, 130d, 130e, 130f, 130g and 130h. The image shown in FIG. 5 is intended to be viewed by a right eye. A similar image to the one shown in FIG. 5, but flipped along the vertical axis, can be raster scanned and be intended for viewing by a left eye. In FIGS. 3, 4 and 5 dash-dot-dash lines have been included to help show the boundaries of the various image portions. However, a viewer of the image would be unable to see such boundaries, as the various image portions would seamlessly blend together when viewed. More specifically, the image processor 104 (in FIG. 1) will ensure that masking, blending, and color gamut matching is done to hide the seams between the various image portions. The portions of the image that are not scanned in FIGS. 2 and 5, shown at the lower left in FIGS. 2 and 5, essentially correspond to the portion of an image viewed by a person's right eye that is occluded by a person's nose. The portion of an image viewed by a person's right eye that is occluded by the person's nose would be the lower right portion.

A scanning display device, such as the device 100 described with reference to FIG. 1, functions by creating "virtual pixels," which will be referred to hereafter more succinctly as pixels. Each pixel is a function of the position of a biaxial mirror (or the positions of two uniaxial mirrors) and the magnitude (amplitude and/or pulse width) of the signals that drive one or more light emitting elements (e.g., laser diodes 112) of a light source that produces a light beam that is reflected by the mirror(s) 118. The light emitting element(s) of each light source 112 can be pulsed rapidly to create each pixel in a high resolution display.

When a light beam 114 is incident on a MEMS mirror 118, a minimum spot size produced by the reflected light beam is achieved when the incident light beam 114 is perpendicular to the reflective surface of the MEMS mirror 118. The spot size produced by a reflected light beam increases where the incident light beam is not perpendicular to the reflective surface of the MEMS mirror 118, with the spot size getting larger as the angle of incidence becomes more oblique. A portion of an image scanned using a small spot size will have a resolution that is greater than another portion of the image scanning using a larger spot size. Accordingly, in certain embodiments the portion of an image corresponding to the foveal region is scanned using the light beam that provides the smallest spot size, and the portion(s) of the image corresponding to non-foveal region(s) is/are scanned using light beam(s) that provide a larger spot size.

Pixel density, as the term is used herein, refers to the number of pixels per unit of space, which can be either angular space or projection space. Conventionally, the pixel density of an image produced by a scanning display device is substantially the same throughout the entire image. Thus, when there has been a desire to increase a pixel density of an image, conventionally the pixel density of the entire image has been increased. This can increase both processing costs and power consumption costs, which are at least partially interrelated. For example, if a pixel count is to be increased by ~50%, e.g., from 600×600 pixels (i.e., 360,000 pixels) to 735×735 pixels (i.e., 540,225 pixels), then an image processor (e.g., 104 in FIG. 1) needs to render approximately 180,000 additional pixels per frame, which increases the amount of power consumption associated with rendering pixels. Additionally, this can also increase the amount of power consumed to display the pixels, since the number of pixels being displayed is increased by ~50%.

In order to reduce the amount of time and power necessary to render pixel data for a frame of an image, foveated rendering can be performed, which takes advantage of the fact that that the resolution of the human eye is highest in the fovea (the central vision area) and lower in peripheral areas, which can also be referred to as non-foveal areas. As a result, if a device uses an eye tracker to detect a gaze direction of a user's eye, computational load can be reduced by rendering an image that has higher resolution at the direction of gaze and lower resolution elsewhere. The portion of an image that has the higher resolution can be referred to as the foveal region, and the portion of the image that has the lower resolution can be referred to as the non-foveal region.

In accordance with certain embodiments, where an image is produced by simultaneously raster scanning a plurality of different portions of an image using a plurality of different light beams (using the same single biaxial MEMS mirror or the same pair of uniaxial MEMS mirrors), all of the different portions of the image can have the same resolution, such that the entire image has a substantially the same resolution throughout the entire image. In accordance with alternative embodiments, different portions of the image can have different resolutions, such that the entire image does not have the same resolution throughout the entire image. For example, a first portion of the image can have a first resolution, and a second portion of the image can have a second resolution that is lower than the first resolution. Continuing with this example, the first portion of an image can correspond to a foveal region of the image, and the second portion of the image can correspond to a non-foveal region. The resolution in the entire non-foveal region can be the same. Alternatively, a non-foveal region can be subdivided into two or more sub-regions, each having a different resolution.

In accordance with certain embodiments, the location of the foveal region can be fixed, e.g., it can be assumed that a user's eye is gazing at the center (or some other portion) of an image and the foveal regions can be the center (or some other portion) of the image. For example, referring to FIG. 4, the center portion of the image, labeled the 5$^{th}$ portion 130e, can be the foveal region, and the surrounding eight other portions of the image shown in FIG. 4 can collectively make up the non-foveal region. For another example, referring to FIG. 5, the portion of the image, labeled the 5th portion 130e, can be the foveal region, and the surrounding seven other portions of the image shown in FIG. 5 can collectively make up the non-foveal region. Rather than the location of the foveal region being fixed, in accordance with alternative embodiments, the location of the foveal region can be dynamically adjusted, e.g., based on a direction of gaze of a user's eye as determined by an eye tracker. Another possibility would be to move the foveated region to a location of interest, e.g., in order to direct a user's gaze toward the location of interest. Other variations are also possible.

Figure 6:
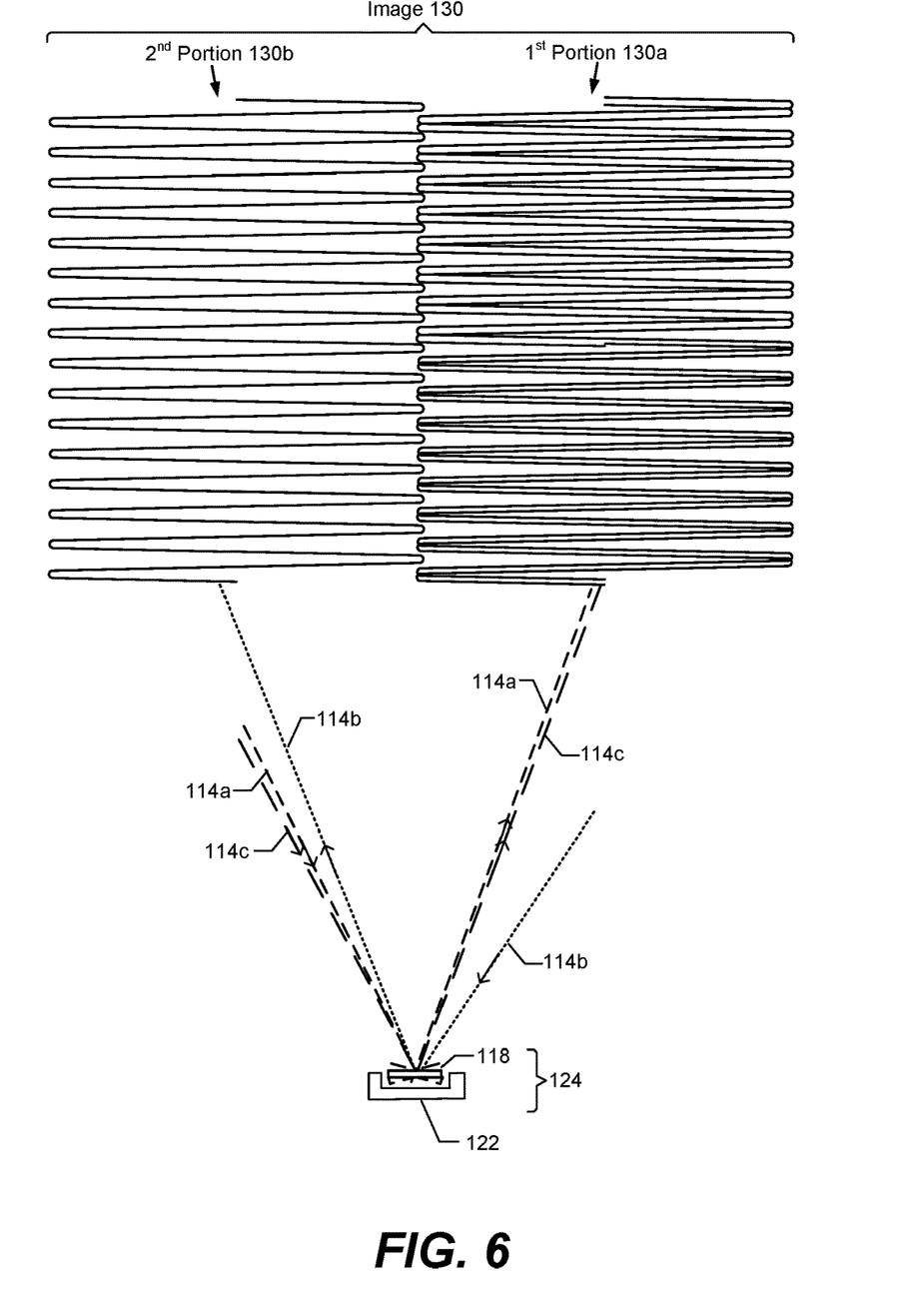
FIG. 6 illustrates how a scanning display device can simultaneously raster scan multiple portions of an image using a same biaxial scanning mirror, or a same pair of uniaxial scanning mirrors, and multiple light beams, with one of the portions of the image being raster scanned using two of the light beams to increase the line count of the portion.

In the above described embodiments, where an image was produced by simultaneously raster scanning a plurality of different portions of an image using a plurality of different light beams (using the same single biaxial MEMS mirror or the same pair of uniaxial MEMS mirrors), a single light beam produced by a different one of a plurality of different light sources was used to raster scan each of the different portions of the image. In other embodiments, two or more different light beams can be used to simultaneously raster scan a same one of the plurality of different portions of an image, to thereby increase the line density, and thus, pixel density, of that portion of the image. An example of this is shown in FIG. 6, which shows the MEMS mirror(s) 118 raster scanning the first portion 130a of the image 130 simultaneously using both the light beam 114a and the light beam 114c to thereby double a line count of the first portion 130a of the image 130 compared to the second portion 130b of the image 130 (and compared to the line density of the first portion 130a of the image 130 if the first portion 130a of the image 130a was raster scanned using only the light beam 114a). Referring back to FIG. 4, the image portion 130e, which is located in the center of the image, can be specified as being the foveal region and can be simultaneously scanned using two light beams so that the line density of the image portion 130e has twice the line density, and thus a higher resolution, than the other image portions shown therein. Similarly, in FIG. 5, the image portion 130e can be specified as being the foveal region and can be simultaneously scanned using two light beams so that the line density of the image portion 130e has twice the line density, and thus a higher resolution, than the other image portions shown therein. It is also within the scope of the embodiments described herein to raster scan a portion an image simultaneously using three or more light beams to further increase the line count of the portion of the image.

Where an image portion (e.g., 130e) is to be simultaneously raster scanned using two light beams, the image processor 104 (in FIG. 1) produces separate pixel data for each of the light beams being raster scanned, and each of the light beams is produced by a separate light source 112 and light source driver 108. Further, the two light beams being used to simultaneously raster scanned a same image portion, to thereby increase its line density, should be appropriately directed towards and incident on the same one of the MEMS mirror(s) at substantially the same angles of incidences with a small spatial offset.

As noted above, the scanning display device 100, which can also be referred to as a scanning display engine, or more generally a display engine, can be integrated with or attached to a portable device, such as, but not limited to, a mobile phone, a smart phone, a portable computer (e.g., a laptop, netbook or tablet), a PDA, or a portable media player (e.g., DVD player). As also noted above, the scanning display device 100 can alternatively be integrated with or attached to a non-portable device, such as a desktop computer, a media player or an automotive heads up display. It is also possible that the scanning display device 100 is part of a VR or AR HMD or HUD, and that the scanning display device 100 produces virtual images that are viewable by a wearer of the HMD or observer of the HUD. The images produced by the scanning display device 100 can be projected onto a screen or other surface. Alternatively, light corresponding to images produced by the scanning display device 100 can be coupled into one or more optical waveguides, and after travelling through the waveguide(s) by way of total internal reflection (TIR), can be out-coupled from the waveguide(s) so that the light is output and imaged from an output-pupil associated with the waveguide(s), e.g., as shown in and described with reference to FIG. 7.

Figure 7:
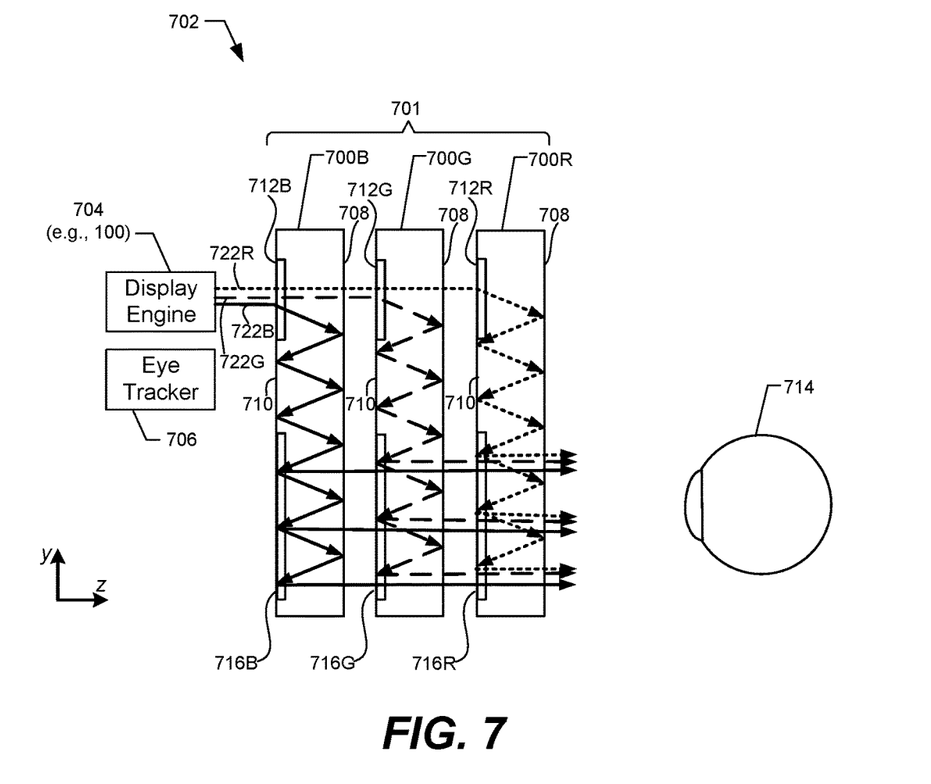
FIG. 7 is a side view of an exemplary display system, according to an embodiment of the present technology.

FIG. 7 is a side view of an exemplary display system 702, according to an embodiment of the present technology. The display system 702 is shown as including three optical waveguides labeled 700R, 700G, 700B and a display engine 704 that generates an image including angular content that is coupled into the waveguides 700R, 700G and 700B by respective input-couplers 712R, 712G and 712B. FIG. 7 also shows a human eye 714 that is viewing the image (as a virtual image) within an eye box that is proximate output-couplers 716R, 716G and 716B. Explained another way, the human eye 714 is viewing the image from an output-pupil associated with the waveguides 700R, 700G and 700B. The display system 702 can be, e.g., a near eye display (NED) or a heads up display (HUD) system, but is not limited thereto.

The optical waveguides 700R, 700G and 700B can be configured, respectively, to transfer red, green and blue light corresponding to an image from an input-pupil to an output-pupil. More specifically, an input-coupler 712R of the waveguide 700R can be configured to couple light (corresponding to a scanned image) within a red wavelength range into the waveguide 700R, and the output-coupler 716R of the waveguide 700R can be configured to couple light (corresponding to the image) within the red wavelength range (which has travelled from the input-coupler 712R to the output-coupler 716R by way of TIR) out of the waveguide 700R. Similarly, an input-coupler 712G of the waveguide 700G can be configured to couple light (corresponding to the scanned image) within a green wavelength range into the waveguide 700G, and the output-coupler 716G of the waveguide 700G can be configured to couple light (corresponding to the image) within the green wavelength range (which has travelled from the input-coupler 712G to the output-coupler 716G by way of TIR) out of the waveguide 700G. Further, an input-coupler 712B of the waveguide 700B can be configured to couple light (corresponding to the scanned image) within a blue wavelength range into the waveguide 700B, and the output-coupler 716B of the waveguide 700B can be configured to couple light (corresponding to the image) within the blue wavelength range (which has travelled from the input-coupler 712B to the output-coupler 716B by way of TIR) out of the waveguide 700B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

The optical waveguides 700R, 700G and 700B can be referred to collectively as the waveguides 700, or individually as a waveguide 700. Two or more of the waveguides 700 can be referred to as a waveguide assembly 701. More specifically, multiple waveguides 700 can be stacked, back-to-back, to provide the waveguide assembly 701. The distance between adjacent waveguides 700 of the waveguide assembly 701 can be, e.g., between approximately 50 micrometers (μm) and 300 μm, but is not limited thereto. While not specifically shown, spacers can be located between adjacent waveguides 700 to maintain a desired spacing therebetween. The input-couplers 712G, 712R and 712B can be referred to collectively as the input-couplers 712, or individually as an input-coupler 712. Similarly, the output-couplers 716G, 716R and 716B can be referred to collectively as the output-couplers 716, or individually as an output-coupler 716. While the waveguide assembly 701 is shown as including three waveguides 700, it is also possible that a waveguide assembly include more or less than three waveguides.

Each of the input-couplers 712 have an input angular range, and each of the output-coupler 716 have an output angular range. In accordance with certain embodiments, all of the input-couplers 712 have substantially the same input angular range, and all of the output-couplers 716 have substantially the same output angular range. In accordance with certain embodiments, the input angular range for the input-couplers 712 is substantially the same as the output angular range for the output-couplers 716. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

In FIG. 7, the dotted arrowed line 722R is representative of red (R) light corresponding to an image that is output by the display engine 704, the dashed arrowed line 722G is representative of green (G) light corresponding to the image that is output by the display engine 704, and the solid arrowed line 722B is representative of blue (B) light corresponding to the image that is output by the display engine 704. While the R, G and B light (722R, 722G and 72B) is shown as being spatially offset from one another, this is likely not the case, but rather, FIG. 7 was drawn in this manner so that the R, G and B light can be separately represented. More likely, the R, G and B light (722R, 722G and 722B) that exits the display engine 704 would completely overlap one another. Further, while the waveguides 700R, 700G and 700B are shown as being stacked in a specific order, the order in which the waveguides 700 are stacked can be changed.

In accordance with specific embodiments, the display engine 704 is implemented using the scanning display device 100 described above with reference to FIG. 1, or a similar scanning display device. In FIG. 7, the display engine 704 is shown as facing back-side surfaces 710 of the waveguides 700, and the eye 714 is shown as facing front-side surfaces 708 opposite and parallel to the back-side surfaces 710. This provides for a periscope type of configuration in which light enters the waveguide on first sides of the waveguides 700, and exits the waveguides 700 at an opposite sides of the waveguides 700. Alternatively, the input-couplers 712 and the output-couplers 716 can be implemented in a manner such that the display engine 704 and the eye 714 are proximate to and face a same major planar surface (708 or 710).

The waveguide assembly 701 can be incorporated into a see-through mixed reality display device system, but is not limited to use therewith. A separate instance of the waveguide assembly 701 and the display engine 704 can be provided for each of the left and right eyes of a user. In certain embodiments, such waveguide assemblies 701 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 704 can be located to the side of the frame so that it sits near to a user's temple. Alternatively, the display engine 704 can be located in a central portion of the HMD glasses that rests above a nose bridge of a user. Other locations for the display engine 704 are also possible. In these instances, the user can also be referred to as a wearer. Where there is a separate waveguide assembly for each of the left and right eyes of a user, there can be a separate display engine 704 for each of the waveguide assemblies, and thus, for each of the left and right eyes of the user. One or more further adjacent waveguides can be used to perform eye tracking based on infrared light that is incident on and reflected from the user's eye(s) 714, as is known in the art.

Block 706 in FIG. 7 is representative of an eye tracker that can be used to track the gaze of an eye. The eye tracker 706 can utilize one or more further adjacent waveguides to perform eye tracking based on infrared light that is incident on and reflected from the user's eye(s) 714, as noted above, as is known in the art. It is also possible that the eye tracker 706 not utilize any waveguides, as is also known in the art. Rather, they eye tracker 706 can direct light directly into the eye 714 and detect direct reflections therefrom. The eye tracker 706 can include, e.g., a light source that emits infrared light (or light of another wavelength), and a light sensor or camera that produces eye tracking data, as is known in the art. The eye tracker 706 can detect infrared light (or, light of another wavelength) reflected from the eye 714 and sensed by a video camera or some other specially designed optical sensor. The information is then analyzed to extract eye rotation from changes in reflections. Video-based eye trackers typically use the corneal reflection (also known as the first Purkinje image) and the center of the pupil as features to track over time. For another example, a dual-Purkinje type of eye tracker can use reflections from a front of the cornea (also known as the first Purkinje image) and the back of the lens (also known as the fourth Purkinje image) as features to track. The eye tracker 706 can alternatively image features from inside the eye, such as the retinal blood vessels, and follow these features as the eye rotates. The use and inclusion of other types of eye trackers is also within the scope of the embodiments described herein.

Figure 8:
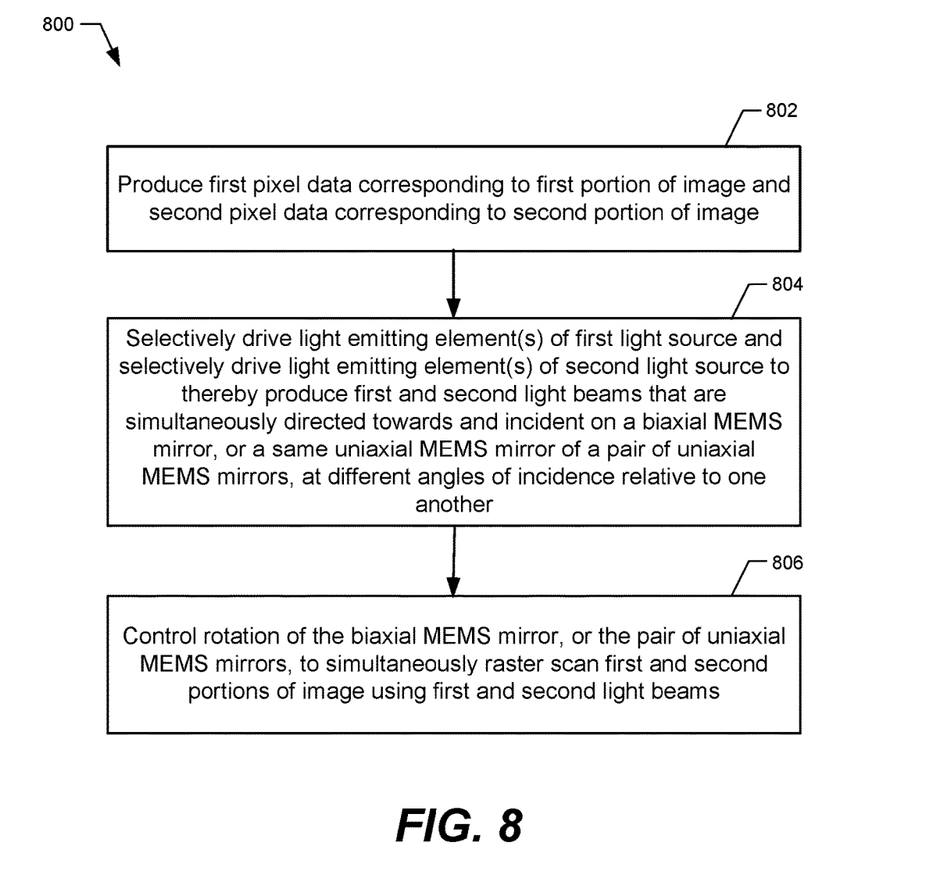
FIG. 8 is a high level flow diagram used to summarize methods according to various embodiments of the present technology which can be used to simultaneously raster scan multiple portions of an image using a same biaxial scanning mirror, or a same pair of uniaxial scanning mirrors, and multiple light beams.

The high level flow diagram of FIG. 8 will now be used to summarize methods according to various embodiments of the present technology which can be used to simultaneously raster scan multiple portions of an image using a same biaxial scanning mirror, or a same pair of uniaxial scanning mirrors, and multiple light beams.

Referring to FIG. 8, step 802 involves producing first pixel data corresponding to a first portion of an image and second pixel data corresponding to a second portion of the image. For example, referring back to FIG. 1, the first portion of the image can be the portion 130*a* and the second portion of the image can be the portion 130*b*, which is adjacent to the first portion 130*a*.

Referring again to FIG. 8, step 804 involves selectively driving one or more light emitting elements of a first light source and selectively driving one or more light emitting elements of a second light source to thereby produce a first light beam and a second light beam that are simultaneously directed towards and incident on a biaxial MEMS mirror, or a same uniaxial MEMS mirror of a pair of uniaxial MEMS mirrors, at different angles of incidence relative to one another. Step 804 can also involve using the first pixel data and the second pixel data to perform the selective driving of the one or more light emitting elements of the first light source and the selective driving of the one or more light emitting elements of the second light source to thereby produce the first light beam and the second light beam that are simultaneously directed towards and incident on the biaxial MEMS mirror or the same one of the pair of uniaxial MEMS mirrors.

Step 806 involves controlling rotation of the biaxial MEMS mirror, or the pair of uniaxial MEMS mirrors, to simultaneously raster scan a first portion of an image using the first light beam and a second portion of the image, which is adjacent to the first portion of the image, using the second light beam. Additional details of how this can be accomplished are shown in and described above with reference to FIG. 1.

The method summarized in FIG. 8 can also include selectively driving one or more light emitting elements of one or more further light sources to thereby produce one or more further light beams that is/are simultaneously directed towards and incident on the biaxial MEMS mirror, or the same uniaxial MEMS mirror of the pair of uniaxial MEMS mirrors, that the first and second light beams are simultaneously directed toward and incident on. Such an embodiment can also include using the biaxial MEMS mirror, or the pair of uniaxial MEMS mirrors, to also raster scan one or more further portions of the image, using the one or more further light beams, simultaneously with raster scanning the first and second portions of the image. Examples of simultaneously raster scanning three or more portions of an image are shown in and described above with reference to FIGS. 2-5.

In certain embodiments, a method can also include selectively driving one or more light emitting elements of a third light source to thereby produce a third light beam that is directed towards and incident on the biaxial MEMS mirror or same uniaxial MEMS mirror of the pair of uniaxial MEMS mirrors that the first and second light beams are directed toward and incident on. In such an embodiment, both the first light beam and the third light beam can be simultaneously used to raster scan the first portion of the image to thereby double a line count of the first portion of the image compared to if the first portion of the image was raster scanned using only the first light beam. In this embodiment, the first portion of the image would have double the line count as the second portion of the image, assuming the second portion of the image was raster scanned using only the second light beam. An example of this was shown in and described above with reference to FIG. 6. Where three light beams are being produced, step 802 can include producing first pixel data, second pixel data and third pixel data that are used to control timings of when, and magnitudes at which, the one or more light emitting elements of the first, second and third light sources are driven respectively to produce the first, second and third light beams.

A human eye essentially integrates light that is incident on the eye when perceiving brightness. This is why a human eye cannot typically perceive the difference between pixels that have their brightness controlled by amplitude modulation, pixels that have their brightness controlled by pulse width modulation, and pixels that have their brightness controlled by a combination of amplitude and pulse width modulation. Because of the way that a human eye perceives brightness, if not correctly compensated for, a portion of an image that has a greater line density could be perceived to be significantly brighter than a portion of an image having a lower line density, which could adversely affect the overall image quality. For a simple example, assume an entire frame of an image is to have a same color (e.g., green) and same brightness. If the magnitude information included in the pixel data used to generate pixels in a portion of the image having a greater line density is the same as the magnitude information included in further pixel data used to generate pixels in a further portion of the image having a lower line density, then the portion of the image having the higher line density will appear brighter to an eye that is viewing the image. In accordance with certain embodiments of the present technology, the image data is produced (e.g., by the image processor 104 in FIG. 1) in such a manner so as to compensate for this situation. Where the first portion of the image has double the line count as the second portion of the image, step 802 can also include selecting the magnitudes at which the light emitting elements of the first, second and third light sources are driven to compensate for how brightnesses of first and second portions of the image are affected by the first portion of the image being raster scanned using both the first and third light beams while the second portion of the image is raster scanned using only the second light beam.

While not limited to use with AR and VR systems, embodiments of the present technology are especially useful therewith since AR and VR systems provide for their best immersion when there is a wide FOV. Also desirable with AR and VR systems is a high pixel density for best image quality. Supporting a wide field of view with a conventional display panel is problematic from a power, cost, and form factor point of view. The human visual system is such that high resolution is usually only useful in a foveal region, which is often the center of the field of view. Embodiments of the present technology described herein provide a scanning display which can support high resolution in a center of the FOV and lower resolution outside that region. More generally, embodiments of the present technology, described herein, can be used to tile a display using a common biaxial MEMS mirror (or a common pair of uniaxial MEMS mirrors) to produce all tiles.

Conventionally, a scanning display device that includes a biaxial MEMS mirror or a pair of uniaxial MEMS mirrors can only support a FOV of less than sixty degrees. Embodiments of the present technology can be used to significantly increase the FOV that can be achieved using a scanning display device, as can be appreciated from the above discussion.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, the term "based on" may be read as "based at least in part on."

For purposes of this document, without additional context, use of numerical terms such as a "first" object or portion, a "second" object or portion, and a "third" object or portion may not imply an ordering of objects or portion, but may instead be used for identification purposes to identify different objects or portions.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a MEMS scanner including a biaxial MEMS mirror or a pair of uniaxial MEMS mirrors;
a controller communicatively coupled to the MEMS scanner and configured to control rotation of the biaxial MEMS mirror or the pair of uniaxial MEMS mirrors of the MEMS scanner;
a first light source comprising a plurality of first light emitting elements and configured to produce a plurality of first light beams; and
a second light source comprising one or more second light emitting elements and configured to produce a second light beam;
wherein the plurality of first light beams and the second light beam produced respectively by the first light source and the second light source are simultaneously directed toward and incident on the biaxial MEMS mirror, or a same one of the pair of uniaxial MEMS mirrors, at different angles of incidence relative to one another;
wherein the controller is configured to control the rotation of the biaxial MEMS mirror or the pair of uniaxial MEMS mirrors of the MEMS scanner to simultaneously raster scan a first portion of an image using the plurality of first light beams and a second portion of the image, which is adjacent to the first portion of the image, using the second light beam;
wherein the raster scan of the first portion of the image using the plurality of first light beams increases a line count of the first portion of the image compared to the second portion of the image; and
wherein the first portion of the image has a first resolution, and the second portion of the image has a second resolution that is lower than the first resolution.

2. The apparatus of claim 1, wherein:
the first light source further comprising red, green and blue laser diodes that are configured to respectively emit red, green and blue light and one or more elements that is/are configured to combine the red, green and blue light into the plurality of first light beams; and
the second light source further comprising red, green and blue laser diodes that respectively emit further red, green and blue light and one or more further elements that is/are configured to combine the further red, green and blue light into the second light beam.

3. The apparatus of claim 1, wherein:
the first portion of the image comprises a foveal region of the image; and
the second portion of the image comprises a non-foveal region of the image.

4. The apparatus of claim 1, wherein a first spot size produced using the plurality of first light beams that is used to raster scan the first portion of the image is smaller than a second spot size produced using the second light beam that is used to raster scan the second portion of the image.

5. The apparatus of claim 1, further comprising:
a first light source driver configured to selectively drive the plurality of first light emitting elements of the first light source to thereby produce the plurality of first light beams; and
a second light source driver configured to selectively drive the one or more second light emitting elements of the second light source to thereby produce the second light beam.

6. The apparatus of claim 5, further comprising an image processor that is configured to produce:
   first pixel data that is provided to the first light source driver and used by the first light source driver to control timings of when, and magnitudes at which, the plurality of first light emitting elements of the first light source are driven; and
   second pixel data that is provided to the second light source driver and used by the second light source driver to control timings of when, and magnitudes at which, the one or more second light emitting elements of the second light source are driven.

7. The apparatus of claim 6, wherein:
   the image processor produces the first pixel data and the second pixel data to control the magnitudes at which the plurality of first light emitting elements of the first light source and the one or more second light emitting elements of the second light source are driven to compensate for how brightnesses of the first portion of the image and the second portion of the image are affected by the second portion of the image having the second resolution that is lower than the first resolution of the first portion of the image.

8. The apparatus of claim 1, further comprising:
   one or more further light sources configured to produce one or more further light beams;
   wherein the one or more further light beams, produced by the one or more further light sources, along with the plurality of first light beams and the second light beam, are simultaneously directed toward and incident on the biaxial MEMS mirror, or the same one of the pair of uniaxial MEMS mirrors, at different angles of incidence relative to one another; and
   wherein the biaxial MEMS mirror, or the pair of uniaxial MEMS mirrors, also raster scan one or more further portions of the image, using the one or more further light beams, simultaneously with raster scanning the first portion of the image and the second portion of the image.

9. The apparatus of claim 1,
   wherein the plurality of first light beams includes two light beams to thereby double a line count of the first portion of the image compared to the second portion of the image that is raster scanned using only the second light beam.

10. A method, comprising:
    selectively driving a plurality of first light emitting elements of a first light source and selectively driving one or more second light emitting elements of a second light source to thereby produce a plurality of first light beams and a second light beam that are simultaneously directed towards and incident on a biaxial MEMS mirror, or a same uniaxial MEMS mirror of a pair of uniaxial MEMS mirrors, at different angles of incidence relative to one another; and
    controlling rotation of the biaxial MEMS mirror, or the pair of uniaxial MEMS mirrors, to simultaneously raster scan a first portion of an image using the plurality of first light beams and a second portion of the image, which is adjacent to the first portion of the image, using the second light beam, wherein the raster scan of the first portion of the image using the plurality of first light beams increases a line count of the first portion of the image compared to the second portion of the image, wherein the first portion of the image has a first resolution, and the second portion of the image has a second resolution that is lower than the first resolution.

11. The method of claim 10, further comprising:
    selectively driving one or more light emitting elements of one or more further light sources to thereby produce one or more further light beams that is/are directed towards and incident on the biaxial MEMS mirror, or the same uniaxial MEMS mirror of the pair of uniaxial MEMS mirrors, that the plurality of first light beams and the second light beam are directed toward and incident on; and
    using the biaxial MEMS mirror, or the pair of uniaxial MEMS mirrors, to also raster scan one or more further portions of the image, using the one or more further light beams, simultaneously with raster scanning the first portion of the image and the second portion of the image.

12. The method of claim 10, further comprising:
    producing first pixel data corresponding to the first portion of the image and second pixel data corresponding to the second portion of the image; and
    using the first pixel data and the second pixel data to perform the selective driving of the plurality of first light emitting elements of the first light source and the selective driving of the one or more second light emitting elements of the second light source to thereby produce the plurality of first light beams and the second light beam that are simultaneously directed towards and incident on the biaxial MEMS mirror or the same one of the pair of uniaxial MEMS mirrors.

13. The method of claim 10,
    wherein the plurality of first light beams includes two light beams to thereby double a line count of the first portion of the image compared to if the first portion of the image was raster scanned using only the first light beam.

14. The method of claim 10, further comprising:
    producing first pixel data and second pixel data that are used to control timings of when, and magnitudes at which, the plurality of first light emitting elements of the first light source and the one or more second light emitting elements of the second light source are driven to produce the plurality of first light beams and the second light beam;
    wherein the producing the first pixel data and the second pixel data includes selecting the magnitudes at which the plurality of first light emitting elements of the first light source and the one or more second light emitting elements of the second light source are driven to compensate for how brightnesses of the first portion of the image and the second portion of the image are affected by the first portion of the image being raster scanned using the plurality of first light beams while the second portion of the image is raster scanned using only the second light beam.

15. A near eye or heads up display system, comprising:
    a MEMS scanner including a biaxial MEMS mirror or a pair of uniaxial MEMS mirrors;
    a controller communicatively coupled to the MEMS scanner and configured to control rotation of the biaxial MEMS mirror or the pair of uniaxial MEMS mirrors of the MEMS scanner;
    a first light source comprising a plurality of first light emitting elements;
    a second light source comprising one or more second light emitting elements;

a first light source driver configured to selectively drive the plurality of first light emitting elements of the first light source to thereby produce a plurality of first light beams;

a second light source driver configured to selectively drive the one or more second light emitting element of the second light source to thereby produce a second light beam; and one or more optical waveguides each of which includes an input-coupler and an output-coupler;

wherein the plurality of first light beams and the second light beam are simultaneously directed toward and incident on the biaxial MEMS mirror, or a same one of the pair of uniaxial MEMS mirrors, at different angles of incidence relative to one another;

wherein the controller is configured to control the rotation of the biaxial MEMS mirror or the pair of uniaxial MEMS mirrors of the MEMS scanner to simultaneously raster scan a first portion of an image using the plurality of first light beams and a second portion of the image using the second light beam;

wherein the raster scan of the first portion of the image using the plurality of first light beams increases a line count of the first portion of the image compared to the second portion of the image;

wherein light corresponding to the first portion of the image and the second portion of the image that are raster scanned using the plurality of first light beams and the second light beam reflected from the biaxial MEMS mirror or the pair of uniaxial MEMS mirrors, under the control of the controller, is coupled into the one or more optical waveguides via the input-coupler(s) of the one or more optical waveguide(s);

wherein the light corresponding to the first portion of the image and the second portion of the image, that is coupled into the one or more optical waveguides via the input-coupler(s), travels at least in part by way of total internal reflection (TIR) from the input-coupler(s) to the output-coupler(s) of the one or more optical waveguides; and wherein the output-coupler(s) is/are configured to couple light corresponding to the first portion of the image and the second portion of the image, that has traveled within the one or more optical waveguides from the input-coupler(s) to the output-coupler(s), out of the one or more optical waveguides.

16. The system of claim 15, wherein:
the first portion of the image comprises a foveal region of the image; and
the second portion of the image comprises a non-foveal region of the image.

17. The system of claim 15, further comprising an image processor that is configured to produce:
first pixel data that is provided to the first light source driver and used by the first light source driver to control timings of when, and magnitudes at which, the plurality of first light emitting elements of the first light source are driven; and
second pixel data that is provided to the second light source driver and used by the second light source driver to control timings of when, and magnitudes at which, the one or more second light emitting elements of the second light source are driven.

18. The system of claim 15, further comprising:
one or more further light sources configured to produce one or more further light beams;
wherein the one or more further light beams, produced by the one or more further light sources, along with the plurality of first light beams and the second light beam, are simultaneously directed toward and incident on the biaxial MEMS mirror, or the same one of the pair of uniaxial MEMS mirrors, at different angles of incidence relative to one another; and
wherein the one or more MEMS mirrors also raster scan one or more further portions of the image, using the one or more further light beams, simultaneously with raster scanning the first portion of the image and the second portion of the image.

19. The system of claim 15, further comprising:
wherein the plurality of first light beams includes two light beams to thereby double a line count of the first portion of the image compared to the second portion of the image that is raster scanned using only that second light beam.

* * * * *